(12) United States Patent
Sarkar et al.

(10) Patent No.: US 12,316,640 B2
(45) Date of Patent: May 27, 2025

(54) PERFORMING SECURITY FUNCTIONS FOR AN IN-VEHICLE INTERNET OF THINGS (IoT) NETWORK

(71) Applicant: Micron Technology, Inc., Boise, ID (US)

(72) Inventors: Sourin Sarkar, Bangalore (IN); Kanika Mittal, Agra (IN); Gowrishankar Gajendiran, Bangalore (IN)

(73) Assignee: Micron Technology, Inc., Boise, ID (US)

( * ) Notice: Subject to any disclaimer, the term of this patent is extended or adjusted under 35 U.S.C. 154(b) by 390 days.

(21) Appl. No.: 17/697,620

(22) Filed: Mar. 17, 2022

(65) Prior Publication Data

US 2023/0300139 A1 Sep. 21, 2023

(51) Int. Cl.
| | |
|---|---|
| *H04L 29/06* | (2006.01) |
| *H04L 9/00* | (2022.01) |
| *H04L 9/40* | (2022.01) |
| *H04L 67/12* | (2022.01) |

(52) U.S. Cl.
CPC ............ *H04L 63/102* (2013.01); *H04L 9/006* (2013.01); *H04L 63/08* (2013.01); *H04L 67/12* (2013.01); *H04L 2209/84* (2013.01)

(58) Field of Classification Search
CPC ....... H04L 9/006; H04L 63/08; H04L 63/102; H04L 67/12
See application file for complete search history.

(56) References Cited

U.S. PATENT DOCUMENTS

| | | | |
|---|---|---|---|
| 2018/0006829 A1* | 1/2018 | Kravitz | ................. H04W 12/06 |
| 2021/0185095 A1* | 6/2021 | Harel | .................... H04L 9/0894 |
| 2023/0129539 A1* | 4/2023 | Dover | ..................... G06F 21/71 |
| | | | 711/154 |

* cited by examiner

*Primary Examiner* — William J. Goodchild
*Assistant Examiner* — Thong P Truong
(74) *Attorney, Agent, or Firm* — Harrity & Harrity, LLP

(57) ABSTRACT

In some implementations, a device of an Internet of Things (IoT) network may receive, from a host associated with the IoT network, information associated with the IoT network. The device may store, via a memory controller of the device, the information in a memory with an embedded hardware security module of the device, wherein the device serves as a root of trust for the host using the information stored in the memory. The device may receive, from the host, a request to perform a security function. The device may perform, based on the request, the security function using the information stored in the memory. The device may generate an alert based on an outcome of the security function. Numerous other implementations are described.

24 Claims, 7 Drawing Sheets

100

200

400 →

PERFORMING SECURITY FUNCTIONS FOR AN IN-VEHICLE INTERNET OF THINGS (IoT) NETWORK

TECHNICAL FIELD

The present disclosure generally relates to network security and, for example, to performing security functions for an in-vehicle Internet of Things (IoT) network.

BACKGROUND

A vehicle may have a number of sensors which operate to support functional features of the vehicle. The sensors may generate and store data to support the functional features of the vehicle. The sensors may communicate the data within the vehicle and outside of the vehicle to support the functional features of the vehicle.

DETAILED DESCRIPTION

Figure 1:
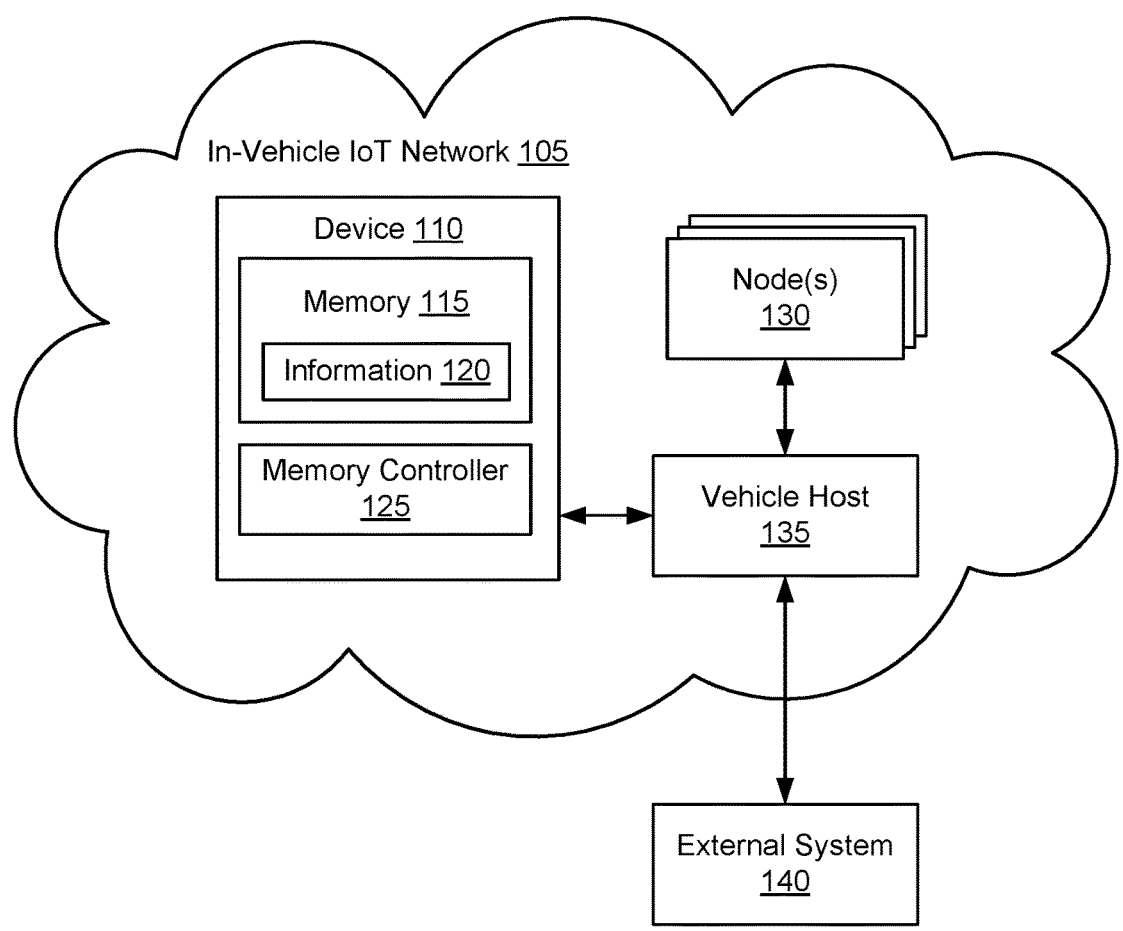
FIG. 1 is a diagram illustrating an example of an in-vehicle Internet of Things (IoT) network that includes a device with a memory having an embedded hardware security module.

A vehicle, such as an autonomous vehicle or a non-autonomous vehicle, may have a number of sensors, controllers, and intelligent functional nodes, which may operate to support functional features (e.g., safety features, such as automatic braking or blind spot monitoring) of the vehicle. The sensors may be included in an in-vehicle Internet of Things (IoT) network (or an in-vehicle sensor network). The sensors may generate and store data to support the functional features of the vehicle. The sensors may communicate the data within the in-vehicle IoT network and outside of the in-vehicle IoT network to support the functional features of the vehicle. The data may include real-time sensor data, sensitive user data, and/or sensor configurations and parameters. The controllers and/or the intelligent functional nodes may control various components of the vehicle, such as motors, switches, actuators, and so on. In an autonomous vehicle, the controllers and/or the intelligent functional nodes may also control components of the vehicle used for autonomous driving, such as accelerating components, braking components, steering components, and so on.

The vehicle may be a connected vehicle that supports various communication protocols, such as a vehicle-to-everything (V2X) protocol, a vehicle-to-infrastructure (V2I) protocol, a vehicle-to-network (V2N) protocol, a vehicle-to-vehicle (V2V) protocol, a vehicle-to-pedestrian (V2P) protocol, a vehicle-to-device (V2D) protocol, and/or a vehicle-to-grid (V2G) protocol.

Such vehicles may be vulnerable to an attack. Typical security vulnerabilities of the in-vehicle IoT network may include active passenger safety modules, active vehicle stability control modules, advanced driver-assistance systems (ADAS) modules (e.g., lane assist, autonomous breaking, pedestrian detection, blind spot warning, and other functions), climate control modules, emergency communication modules, in-vehicle location services modules, electrical modules of the vehicle, telemetry modules of the vehicle, and/or electronic control units of the vehicle. When such modules of the vehicle are compromised, vehicle safety cannot be ensured and a risk may be posed to users of the vehicle and for others outside of the vehicle. Furthermore, the attack may result in malicious access to stored data, malicious configuration changes to functional nodes, malicious firmware changes, and/or malicious access to interconnected communications. The attack may occur during manufacturing of the vehicle, when passengers are traveling within the vehicle, or when the vehicle is interacting with an infrastructure or nearby vehicles.

The vehicle may have a complex network of different components and modules, which may include dumb nodes, semi-intelligent nodes, sensor nodes, and highly intelligent nodes with high computing potential inside of the vehicle. Such complexity may result in various problems, such as eliminating a single point of failure and increased difficulty in ensuring security for a complete system (e.g., the entire in-vehicle IoT network). Today, security approaches are fragmented and may be tailored to specific components or modules, but may be insufficient for securing the complete system.

To solve the problems described above, as well as to provide security to the in-vehicle IoT network, a technical solution is described herein for performing security functions for the in-vehicle IoT network of a vehicle. A device of the in-vehicle IoT network, which may be referred to as a trusted authority (TA), may include a memory with an embedded hardware security module and a memory controller. The device may receive, from a vehicle host associated with the in-vehicle IoT network, a registration configuration during an initial provisioning of the device that configures the device to serve as a root of trust for the vehicle host (e.g., by storing cryptographic keys, by performing cryptographic functions, and/or by enabling a secure boot process). The device may receive, from the vehicle host, information associated with a node of the in-vehicle IoT network and/or a user of the vehicle associated with the in-vehicle IoT network. The device may store, via the memory controller, the information in the memory with the embedded hardware security module. The device may serve as the root of trust for the vehicle host using the information stored in the memory. The device may receive, from the vehicle host, a request to perform a security function. The device may perform, based on the request, the security function for the in-vehicle IoT network in conjunction with the vehicle host using the information stored in the memory. The device may generate an alert based on an outcome of the security function.

In some implementations, the in-vehicle IoT network may be secured using the device within the in-vehicle IoT network. The in-vehicle IoT network may be a mesh network or a non-mesh network. The device may be an embedded secure element within the in-vehicle IoT network, which may provide security to automotive functions, user identity, user data, and/or various components and modules. The device may provide the security enabled by Federal Information Processing Standards (FIPS) and/or National Institute of Standards and Technology (NIST) algorithm based cryptographic techniques to the in-vehicle IoT network.

In some implementations, the device may be used to provide security functions for authentication and verification of nodes within the in-vehicle IoT network. The device may provide security functions, such as authentication and verification of identity. The device may provide the root of trust (or core root of trust) within the in-vehicle IoT network, where the root of trust may be used by an application layer of the vehicle to ensure security of the in-vehicle IoT network. The device may ensure that stored data is secure, functional nodes are safe from malicious configuration changes, functional nodes are safe from malicious firmware changes, and/or interconnected communications are secure. The device may verify whether a given transaction (e.g., replacing a node of the vehicle) is a trusted transaction coming from a trusted source or a trusted originator of a request, and if so, the device may permit the transaction to be performed.

In some implementations, the device may function in conjunction with the vehicle host to provide the security. After the device is successfully provisioned, the device may establish the root of trust for the vehicle host. The vehicle host may use the device for identify verification, authentication, or other security functions.

In some implementations, the device may provide various security benefits for the in-vehicle IoT network. The device may protect the user identity from remote snooping. The device may protect a modification to an in-memory or in-store data in the vehicle that is used for security functions of the vehicle. The device may provide hardware attack detection and may perform various security measures, such as destroying sensitive data. The device may protect vehicle control elements from tampering. The device may prevent wireless hacking of the in-vehicle IoT network for malicious alteration of the sensors and components. The device may prevent wireless hacking from inside the vehicle by a passenger riding in the vehicle. The device may prevent man-in-the-middle (MITM) attacks within the in-vehicle IoT network.

FIG. 1 is a diagram illustrating an example 100 of an in-vehicle IoT network 105 that includes a device 110 with a memory 115 having an embedded hardware security module. As shown, the memory 115 may store information 120, the device 110 may include a memory controller 125, the in-vehicle IoT network may include one or more nodes 130 and/or a vehicle host 135, and the vehicle host 135 may communicate with an external system 140.

In some implementations, the device 110 (e.g., a TA), the vehicle host 135, and the one or more nodes 130 may be included in the in-vehicle IoT network 105. The device 110 may include the memory 115 with the embedded hardware security module. The memory 115 may store information 120 associated with the in-vehicle IoT network 105. For example, the information 120 may be associated with a node 130 of the in-vehicle IoT network 105, and/or the information 120 may be associated with a user of a vehicle associated with the in-vehicle IoT network 105. The device 110 may include a memory controller 125 to store the information 120 (or write information) in the memory 115 and to access the information 120 (or read information) from the memory 115. The device 110 with the memory 115 having the embedded hardware security module may communicate with the vehicle host 135 (e.g., a processor) to perform security functions for the in-vehicle IoT network 105, which may protect the in-vehicle IoT network 105 from attacks, as described in further detail herein. For example, a security function may include node verification, as further described with respect to FIG. 2, or user authorization, as further described with respect to FIG. 3. The vehicle host 135 may communicate with an external system 140 outside of the in-vehicle IoT network 105.

In some implementations, a node 130 may be a dumb node capable of performing a function. For example, the dumb node may perform a function related to taking a measurement (e.g., using a sensor). The dumb node may not automatically signal an output of the function, but rather may be instructed to signal the output of the function. The dumb node may be controlled and monitored by the vehicle host 135.

In some implementations, a node 130 may be an intelligent node having a computation and decision-making capability. In some implementations, an intelligent node may automatically perform an action (e.g., controlling a vehicle component and/or signaling information to another node) based on sensed information, whereas a dumb node may not automatically perform an action (e.g., without receiving a request for the action to be performed). For example, the intelligent node may have a capability of processing camera information and detecting objects, where an output may be transmittable to another node of the vehicle (e.g., an onboard computer). As another example, the intelligent node may have a capability of detecting a temperature inside of the vehicle and turning on a heating component of the vehicle.

In some implementations, a node 130 may be a sensor node capable of reporting sensory data on-demand or in accordance with a defined periodicity. The sensor node may report sensor data to another entity of the in-vehicle IoT network, such as the vehicle host 135 or a control node. As an example, the sensor node may be an image sensor, a temperature sensor, a tire pressure sensor, a proximity sensor, or the like, where each sensor node may be associated with a subsystem of the vehicle (e.g., a lane assist subsystem and/or a parking subsystem).

In some implementations, a node 130 may be a control node capable of controlling the dumb node, the intelligent node, and/or the sensor node. For example, the control node may have a capability of activating or deactivating a set of sensors based on a condition being satisfied. The control node may report information regarding the dumb node, the intelligent node, and/or the sensor node to the vehicle host 135.

In some implementations, the in-vehicle IoT network 105 may include any number of each type of node 130 (e.g., dumb node, intelligent node, sensor node, and/or control node), and may include multiple types of nodes 130. In some implementations, groups of nodes 130 may be associated with different subsystems of the vehicle. For example, a climate control subsystem of the vehicle may be associated with a first set of nodes, an autonomous driving subsystem of the vehicle may be associated with a second set of nodes, and so on.

In some implementations, the device 110 may be provisioned in the vehicle, during which the device 110 may be established as a root of trust within the in-vehicle IoT network 105. During the provisioning, which may occur at a secure premises of a manufacturer, the manufacturer may provide a file (e.g., a configuration file or an executable file) that is read by the device 110. The file may configure the device 110 to serve as the root of trust within the in-vehicle IoT network 105. The file may configure the device to provide a hardware-based security capability within memory, such as the embedded hardware security module of the memory 115. The file may configure the device 110 to integrate true hardware based roots of trust into the memory 115 (e.g., flash memory), which may enable strong cryptographic identity and health management for IoT devices of the vehicle. The file may configure the device 110 to move security primitives in-memory, which may help to protect the integrity of code and data housed within the memory 115.

In some implementations, a vehicle operating system that runs on the vehicle host 135 may recognize the device 110 and provide a registration configuration to the device 110 during the initial provisioning of the device 110. The registration configuration may enable the device 110 to register with the vehicle host 135. The registration configuration may enable the device 110 to perform security functions related to the security of the in-vehicle IoT network 105. The registration configuration may indicate the information 120 regarding the node 130 of the in-vehicle IoT network 105. For example, the information 120 may indicate cryptographically protected node information (e.g., node signatures). The device 110 may store the information 120 in the memory 115, and the device 110 may subsequently use the information 120 when performing the security functions for the in-vehicle IoT network 105.

In some implementations, after the device 110 is provisioned in the in-vehicle IoT network 105, the device 110 may be established as the root of trust for the vehicle host 135 based on the file loaded onto the device 110 during the provisioning. As a result, the vehicle host 135 may use the device 110 for identity verification and authentication purposes. The device 110 may provide security functions in a secure manner for the in-vehicle IoT network 105. In some implementations, the device 110 may be protected from tampering using an in-built tamper detection component (e.g., tamper detection electronic circuitry). The tamper detection component may establish a tamper protection perimeter, which may be a hardware implementation used for detecting a breach of the device 110.

In some implementations, the vehicle host 135 may be directly accessible to the device 110. Communications between the vehicle host 135 and the device 110 may be based on a public key infrastructure framework. The vehicle host 135 may run a secure real-time operating system and may have drivers that are capable of communicating with the device 110 in a secure fashion. Interactions between the vehicle host 135 and the device 110 may follow the public key infrastructure framework. In some implementations, nodes 130 may not be accessible to the device 110. In other words, nodes 130 may not communicate with the device 110, but rather may communicate with the vehicle host 135. As a result, the device 110 in the in-vehicle IoT network 105 may only be accessible to the vehicle host 135, thereby improving security.

In some implementations, the device 110 may store the information 120 in the memory 115 based on an authenticated write command from the vehicle host 135. For example, the device 110 may receive node information from the vehicle host 135, and the device 110 may store the node information in the memory 115 based on the authenticated write command from the vehicle host 135. In some implementations, the device 110 may retrieve the information 120 in the memory 115 based on an authenticated read command from the vehicle host 135. For example, the device 110 may retrieve user data from the memory 115 based on the authenticated read command from the vehicle host 135, and the device 110 may indicate the user data to the vehicle host 135. In other words, the vehicle host 135 may store/retrieve sensitive data in the memory 115 with the embedded hardware security module using authenticated write/read commands.

In some implementations, the device 110 may store a security key in the memory 115. The device 110 may store the security key for the vehicle host 135. The security key may enable secure communications between the vehicle host 135 and the external system 140. The external system 140 may be a remote end point, such as a server that provides configuration updates to the vehicle. For example, the vehicle host 135 may retrieve the security key from the device 110 prior to performing the secure communications with the external system 140. The security key may be stored at the device 110 and may not be maintained by the vehicle host 135 for increased security. In other words, the device 110 may be used by the vehicle host 135 as a key store for the secure communications between the vehicle host 135 and the external system 140.

In some implementations, the device 110 may provide, in addition to in-vehicle security, security functions in other domains. For example, the device 110 may communicate with the vehicle host 135 to provide security for in-vehicle telemetry services, access to external data networks, and/or over-the-air downloads and updates. For example, over-the-air downloads may require user authorization, which may be performed using the device 110 based on the information 120 stored in the memory 115.

In some implementations, the device 110 may be implemented using an Automotive Open System Architecture (AUTOSAR) platform, which may be used to create and establish an open and standardized software architecture for automotive electronic control units (ECUs). The device 110 may be implemented using an AUTOSAR classic platform, which may have three software layers that run on a microcontroller, which may include an application, a runtime environment, and basic software. The device 110 may be implemented using an AUTOSAR adaptive platform, which may include three layers associated with a user application, an operating system interface, and a virtual machine or container or hardware. The user application layer may be receptive to various security application installations. The device 110 may be implemented by using functional application programming interfaces (APIs).

In some implementations, secure communications between the node 130 and an ECU may be based on elliptic curve cryptography. When the embedded hardware security module is delivered to the device 110 for deployment in the vehicle, the embedded hardware security module may have a private key that is derived from a physical unclonable function (PUF) static random-access memory (SRAM). After the initial provisioning, the device 110 may store a root key in the memory 115, and at this point, the memory 115 may be used by the device 110. The memory 115 may be secure memory based on the embedded hardware security module.

In some implementations, during the provisioning, sensitive data such as user data, unique device identifier (UDI), and/or unique node identifier (UNI) may be wrapped using a cryptographic function, such as secure hash algorithm 256 (SHA256), where a resulting hash of the cryptographic function may be stored in the memory 115 as a golden measurement. During a check of the vehicle, the vehicle host may request the device 110 to verify the sensitive data. A measurement of sensitive data stored in the memory 115 may be performed using cryptographic functions, where an output of the measurement may be compared to the golden measurement. Based on the comparison, the sensitive data may be verified.

In some implementations, the vehicle host 135 may be associated with multiple devices. For example, a dedicated lower density device may be used to store secure data of the in-vehicle IoT network 105, such as security keys, UDIs, and so on. A device with another density level may be used to store user data. In some implementations, sensitive data stored in the device 110 may be physically separated from other storage systems of the vehicle, such that secure communications with encryption may be performed without compromising an overall system latency.

As indicated above, FIG. 1 is provided as an example. Other examples may differ from what is described with regard to FIG. 1.

Figure 2A:
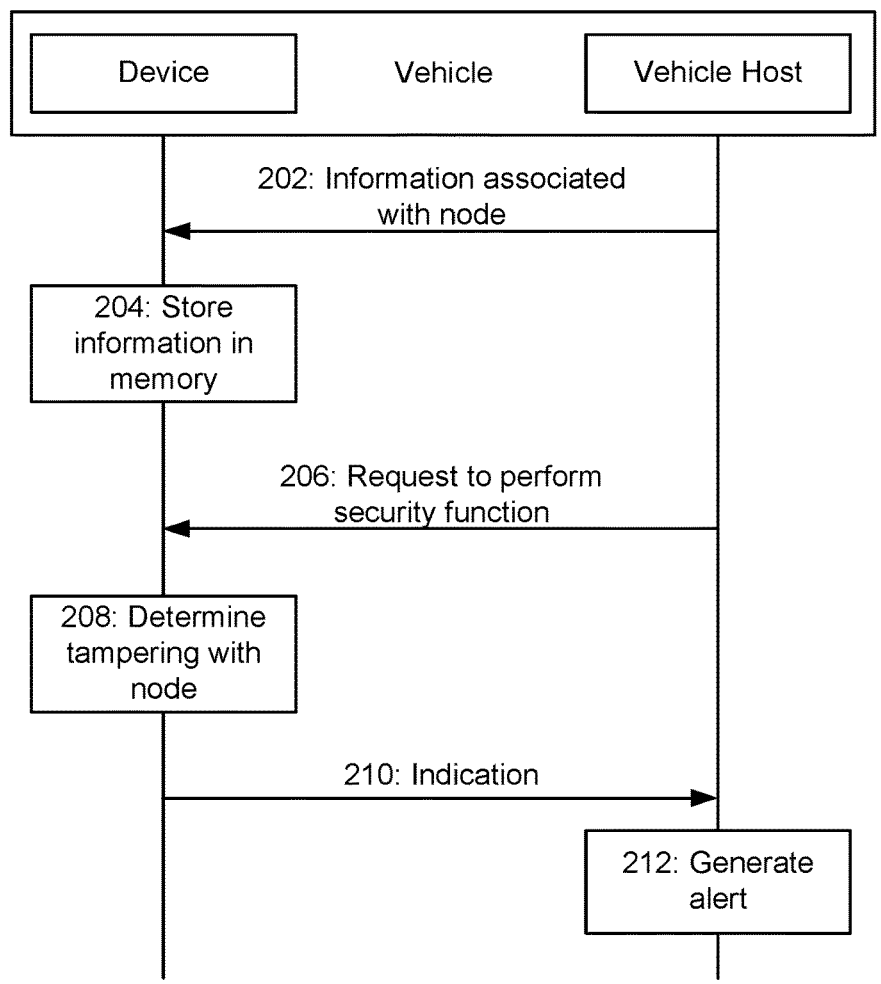
FIGS. 2A-2B are diagrams illustrating examples of node verification and user authorization using a device with an embedded hardware security module.

FIG. 2A is a diagram illustrating an example 200 of node verification. The node verification may be performed using a device (e.g., device 110) with memory (e.g., memory 115) having an embedded hardware security module, a memory controller 125, a node (e.g., node 130), and a vehicle host (e.g., vehicle host 135). The device, the node, and the vehicle host may be associated with an in-vehicle IoT network (e.g., in-vehicle IoT network 105) of a vehicle, as described above in connection with FIG. 1.

As shown by reference number 202, the device may receive information (e.g., information 120) associated with the node from the vehicle host. The device may receive the information associated with the node, as part of the registration configuration, during an initial provisioning of the device. The information may indicate a true node identity associated with the node. The true node identity may be associated with a unique device identification. The unique device identification may be based on a maker code associated with the node, a model code associated with the node, and/or a serial number associated with the node. The maker code may correspond to a maker or manufacturer of the node. The model code may correspond to a model number of the node. The unique device identification may also be referred to as a UDI or a UNI.

As shown by reference number 204, the device may store the true node identity in the memory having the embedded hardware security module. The device may store the true node identity in the memory using the memory controller of the device. The device may serve as a root of trust for the vehicle host using the information stored in the memory.

As shown by reference number 206, the device may receive, from the vehicle host, a request to perform a security function, where the security function may be associated with the node verification. The device may receive the request to perform the node verification in a periodic manner (e.g., once a day) or in an aperiodic manner (e.g., when the vehicle is started). The node verification may be for the purpose of detecting whether a given node in the in-vehicle IoT network has been tampered (e.g., replaced with another node without proper authorization). The request may indicate a candidate node identity associated with the node. The candidate node identity may reflect a node identity of a node that is currently in the in-vehicle IoT network. The device may perform, based on the request, the security function of the node verification using the information stored in the memory of the device.

As shown by reference number 208, the device may determine, during the node verification, that a tampering with the node has occurred based on a comparison of the true node identity, as stored in the memory, with the candidate node identity indicated in the request. The device, when performing the security function, may compare the candidate node identity against the true node identity. For example, the candidate node identity may indicate that the node that is currently in the in-vehicle IoT network is not an original node of the in-vehicle IoT network, which may imply that the original node was tampered. For example, the original node associated with the true node identity may have been improperly replaced with a new node associated with the candidate node identity. As a result, when any node in the in-vehicle IoT network is tampered, an identity check with the device may fail.

As shown by reference number 210, the device may send, to the vehicle host, an indication of the node tampering. The indication may indicate a particular node associated with the tampering. The indication may indicate a type of tampering, such as installing a new node in the vehicle without permission.

As shown by reference number 212, the vehicle host may generate an alert (e.g., a security breach flag) to indicate the tampering with the node. The vehicle host may generate an output (e.g., an indication on a display screen or an audio alert) indicating the node associated with the tampering. Alternatively, the vehicle host may generate an alert to indicate that the node is legitimate, which may be based on the candidate node identity corresponding with (e.g., matching) the true node identity.

In some implementations, the vehicle host may retrieve the true node identity from the device, and the vehicle host may compare the true node identity with the candidate node identity. Based on the comparison of the true node identity and the candidate node identity, the vehicle host may determine whether the node has been tampered. The comparison may be performed at the vehicle host instead of at the device. In some implementations, the vehicle host may perform a periodic autonomous check of a network topology associated with the in-vehicle IoT network, where the periodic autonomous check may be for a node verification or a tamper detection of the node of the in-vehicle IoT network. The vehicle host may perform the periodic autonomous check for all nodes of the network topology, or the vehicle host may perform the periodic autonomous check for a subset of nodes of the network topology. The subset of nodes may correspond to nodes having a higher importance relative to other nodes of the network topology.

In some implementations, a UDI may be used by the vehicle host to uniquely identify different nodes of the in-vehicle IoT network, where the UDI may be constructed using the maker code, the model code, and the serial number. The maker code, the model code, and the serial number may be wrapped in a cryptographic manner to create a unique hash of a device identification, which may produce the UDI. The UDI may be stored within the secure memory of the device. The vehicle host may maintain a database of nodes and associated UDI references, but not actual UDIs, which may not leave the secure memory of the device. When a specific node is discovered in a topology based on a node discovery or programmed after replacing a previous node, the vehicle host may send data associated with the node to the device, where the data may include the maker code, the model code, and the serial number. The device may create the UDI for the node and indicate a reference of the UDI for the node (e.g., not the actual UDI) to the vehicle host. The vehicle host may store the reference for the node in the database, and the vehicle host may compare the reference for the node to the candidate node identity when determining whether the node has been tampered. In other words, the device may store a unique device identification (e.g., UDI)

for the node in the memory of the device, and the device may provide, to the vehicle host, the reference associated with the unique device identification for storage at the vehicle host and for node identification.

As an example, a component (e.g., a steering component or a braking component) of the vehicle may be tampered, such that the component may be remotely controlled by an external device, which may pose a safety issue for the vehicle. The component may be replaced with a substitute component with different settings during the tampering. During a vehicle self-check, the device and/or the vehicle host may determine that the component has been tampered based on a unique device identification associated with the substitute component (or a lack of a device identification associated with the substitute component), which may be different than a UDI associated with the original component. The vehicle host may generate an output indicating, to a user of the vehicle, that the component has been tampered.

As indicated above, FIG. 2A is provided as an example. Other examples may differ from what is described with regard to FIG. 2A.

Figure 2B:
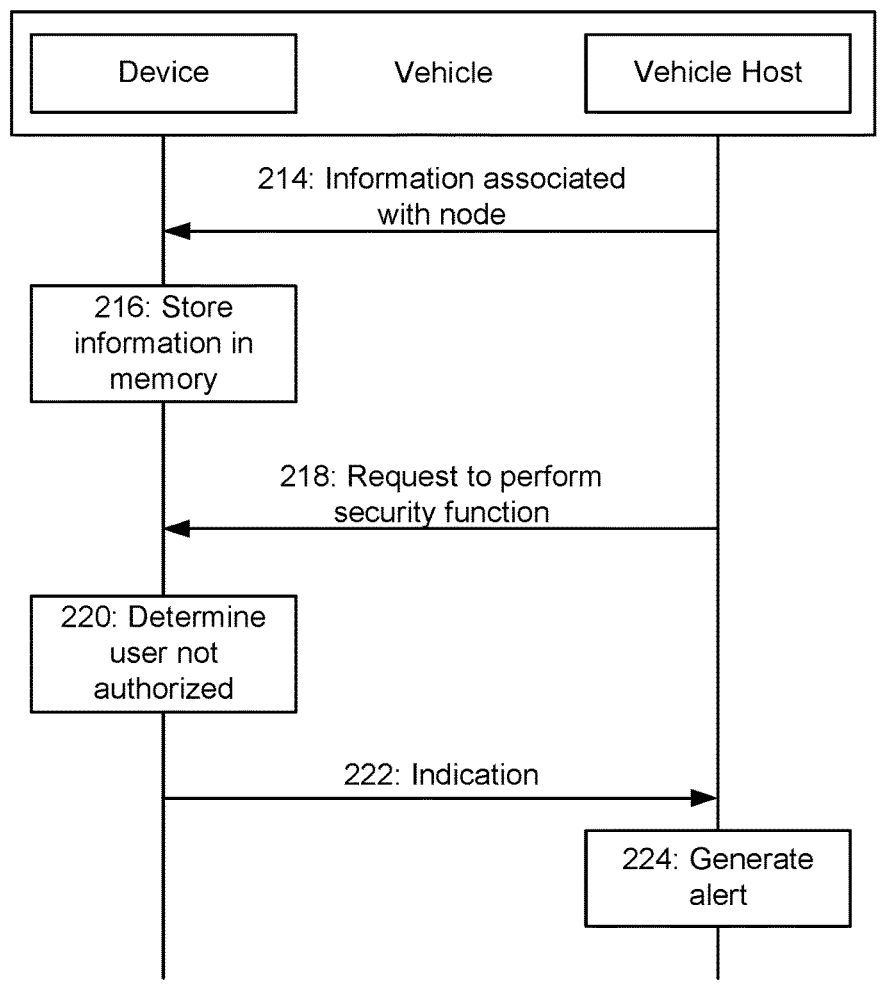

FIG. 2B is a diagram illustrating an example 210 of user authorization. The user authorization may be performed using a device (e.g., device 110) with memory (e.g., memory 115) having an embedded hardware security module, a memory controller 125, a node (e.g., node 130), and a vehicle host (e.g., vehicle host 135). The device, the node, and the vehicle host may be associated with an in-vehicle IoT network (e.g., in-vehicle IoT network 105) of a vehicle.

As shown by reference number 214, the device may receive information (e.g., information 120) associated with a user of the vehicle, where the information may be user data. The device may receive the user data after an initial provisioning of the device. The user data may indicate a true user credential associated with the user of the vehicle. The true user credential may be based on user biometric information and/or user contact information. The biometric information may be based on, for example, a voice recognition, fingerprint scanning, facial recognition, and/or iris recognition. The user contact information may include a user phone number or another type of identification number.

As shown by reference number 216, the device may store the true user credential in the memory having the embedded hardware security module. The device may store the true user credential in the memory using the memory controller of the device. The device may serve as a root of trust for the vehicle host using the information stored in the memory. The device may store the true user credential within the memory having the embedded hardware security module, which may protect the true user credential against attacks, such as a network intrusion attack. The device may store user sensitive data and/or unencrypted user data within the memory having the embedded hardware security module.

As shown by reference number 218, the device may receive, from the vehicle host, a request to perform a security function, where the security function may be associated with the user authorization for the user of the vehicle. The user authorization may be a prerequisite to make changes to the node of the in-vehicle IoT network, which may involve modifying the node of the in-vehicle IoT network, replacing the node of the in-vehicle IoT network (e.g., due to a hardware malfunction), or adding a new node to the in-vehicle IoT network, among other examples. Modifications to the node may involve adjusting a parameter associated with the node, changing a configuration associated with the node, and/or changing firmware associated with the node. The request may indicate a candidate user credential associated with the user. The candidate user credential may be associated with a user for which the user authorization is being performed. The device may perform, based on the request, the security function of the user authorization using the information stored in the memory of the device.

As shown by reference number 220, the device may determine, during the user authorization, that the user is not authenticated based on a comparison of the true user credential, as stored in the memory, with the candidate user credential indicated in the request. The device may, when performing the security function, compare the candidate user credential against the true user credential. For example, the candidate user credential of the user may correspond to a user that is not authorized to make changes to the node of the in-vehicle IoT network.

As shown by reference number 222, the device may send, to the vehicle host, an indication that the user is not authenticated. The indication may indicate a reason for which the user is not authenticated (e.g., fingerprints of the user do not match stored fingerprints, or a face of a user attempting to perform a node modification does not match a stored image of the user's face).

As shown by reference number 224, the vehicle host may generate an alert to indicate that the user is not authorized. The vehicle host may generate an output (e.g., an indication on a display screen or an audio alert) indicating that the user is not authorized to make changes to the node of the in-vehicle IoT network. Alternatively, the vehicle host may generate an alert to indicate that the user is authorized, which may be based on the candidate user credential corresponding with the true user credential.

As an example, a fuel pump regulator of the vehicle may be configurable based on a driving style. Settings of the fuel pump regulator may be throttled for fuel efficiency, depending on a sport setting or daily use setting. The settings may be changeable and programmable, and a configuration of the settings (e.g., different parameters) should be protected. The device may ensure that the settings of the fuel pump regulator should only be configured by authorized persons. The device may verify user credentials of a user that is authorizing a configuration update for the fuel pump regulator to ensure that the settings of the fuel pump regulator are not improperly set.

As another example, a response timing of an automatic braking system (ABS) may be changed via hacking, where such changes may be life threatening. A malicious entity may attempt to delay a response timing of air bag sensors. The device may provide security to ensure that such changes are not implemented by unauthorized users.

In some implementations, the vehicle host may retrieve the true user credential from the device, and the vehicle host may compare the true user credential with the candidate user credential. Based on the comparison of the true user credential and the candidate user credential, the vehicle host may determine whether the user is authorized to make changes to the node of the in-vehicle IoT network. The comparison may be performed at the vehicle host instead of at the device.

In some aspects, the user data, such as the true user credential, may be stored in the memory with the embedded hardware security module. The device may access the user data when the user of the vehicle is to authorize a replacement of parts (e.g., a node replacement), a service of the vehicle (e.g., a node repair), and/or a configuration change (e.g., a node modification). The device may verify the candidate user credential against the true user credential stored at the device. The device may perform user authentication only to the vehicle host. In some cases, inserting a new node or a replacement node may require the user authentication.

In some implementations, a unique device identification associated with the new node or the replacement node may be stored in the memory of the device. In other words, the unique device identification of the new node or the replacement node may be programmed into the memory of the device. In the case of the new node, the unique device identification may subsequently be used for node verification. In the case of the replacement node, the unique device identification may replace an earlier unique device identification of a node that is being replaced, and the unique device identification may subsequently be used for node verification. The earlier unique device identification may be erased from the memory of the device.

In some implementations, the user associated with the vehicle may change (e.g., a new user may purchase the vehicle from an existing user). A new true user credential may be programmed into the memory of the device, and an earlier true user credential may be erased from the memory of the device, subject to a verification/authentication initiated by an initial user of the vehicle. The new true user credential may be used for subsequent user authorizations.

As indicated above, FIG. 2B is provided as an example. Other examples may differ from what is described with regard to FIG. 2B.

Figure 3:
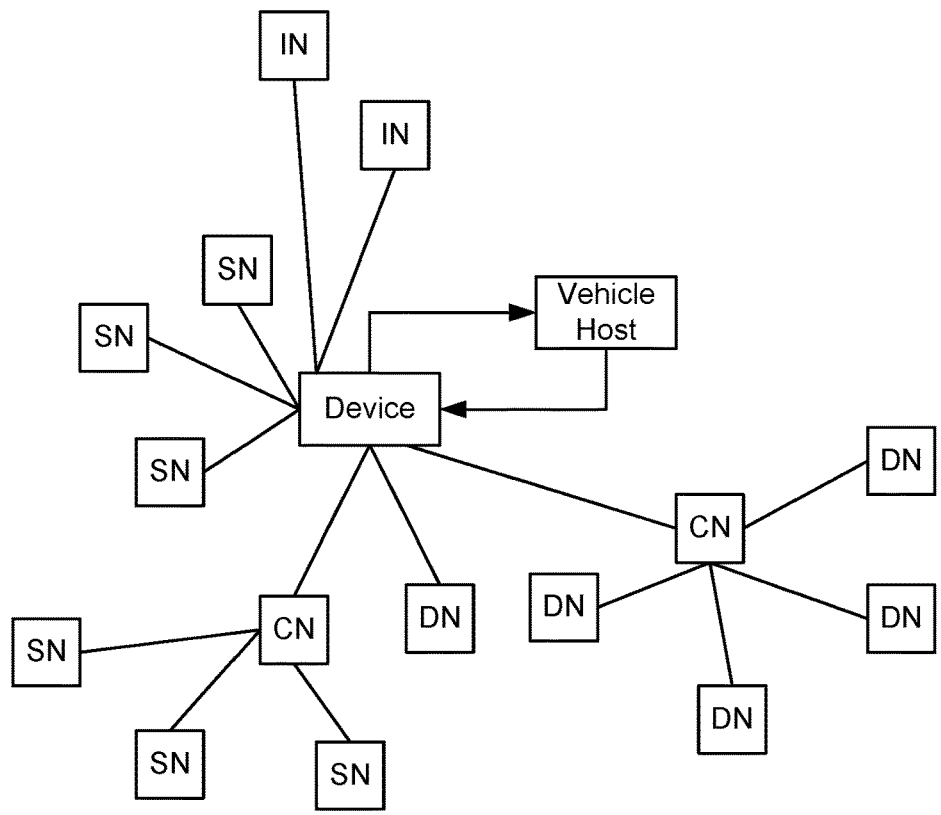
FIG. 3 is a diagram illustrating an example network topology that includes a vehicle host, a device with an embedded hardware security module, and a plurality of nodes.

FIG. 3 is a diagram illustrating an example 300 of a network topology that includes a vehicle host, a device with an embedded hardware security module, and a plurality of nodes.

As shown in FIG. 3, a device (e.g., a TA) may perform security functions for a vehicle host in an in-vehicle IoT network. The in-vehicle IoT network may be associated with a vehicle, and the in-vehicle IoT network may include a plurality of nodes of the vehicle. The vehicle host may communicate with the nodes of the vehicle, which may include dumb nodes, intelligent nodes, sensor nodes, and/or control nodes. Each node may be associated with a UDI. In some cases, certain types of nodes (e.g., dumb nodes) may not be associated with a UDI.

In some implementations, the device may only be accessible to the vehicle host. In other words, the device may only communicate with the vehicle host, and the device may not transmit or receive information from the nodes of the vehicle. As a result, information stored in a memory of the device (e.g., an embedded hardware security module of the device) may be accessible to the vehicle host but may not be accessible to the nodes of the vehicle, which may improve security.

As indicated above, FIG. 3 is provided as an example. Other examples may differ from what is described with regard to FIG. 3.

Figure 4:
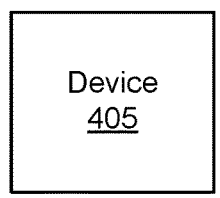
FIG. 4 is a diagram of an example environment in which systems and/or methods described herein may be implemented.
Figure 4:
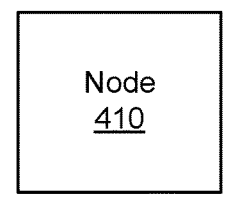
Figure 4:
Figure 4:
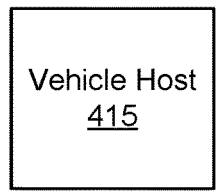
Figure 4:
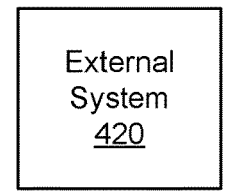

FIG. 4 is a diagram of an example environment 400 in which systems and/or methods described herein may be implemented. As shown in FIG. 4, environment 400 may include a device 405 (which may correspond to device 110), a node 410 (which may correspond to node 130), a vehicle host 415 (which may correspond to vehicle host 135), an external system 420 (which may correspond to external system 140), and a network 425. Devices of environment 400 may interconnect via wired connections, wireless connections, or a combination of wired and wireless connections.

A device 405 includes one or more devices capable of receiving, generating, storing, processing, and/or providing information associated with performing security functions for an IoT network, as described elsewhere herein. The device 405 may include a memory with an embedded hardware security module. The device 405 may include a memory controller. The device 405 may include one or more components configured to perform a security function for the IoT network.

The node 410 includes one or more devices capable of receiving, generating, storing, processing, providing, and/or routing information associated with performing security functions for an IoT network, as described elsewhere herein. The node 410 may be included in the IoT network, such as the in-vehicle IoT network. The node 410 may be a dumb node capable of performing a function, an intelligent node having computation and decision-making capabilities, a sensor node (e.g., a temperature sensor that outputs a temperature), or a control node that controls a dumb node, an intelligent node, and/or a sensor node.

The vehicle host 415 includes one or more devices capable of receiving, generating, storing, processing, providing, and/or routing information associated with performing security functions for an IoT network, as described elsewhere herein. The vehicle host 415 may include a processor, a communication device, and/or a computing device. The vehicle host 415 may operate in conjunction with the device 405 to perform the security function for the IoT network. The vehicle host 415 may be an in-vehicle host in an in-vehicle IoT network.

The external system 420 includes one or more devices capable of receiving, generating, storing, processing, providing, and/or routing information associated with performing security functions for an IoT network, as described elsewhere herein. The external system 420 may include a communication device and/or a computing device. For example, the external system 420 may include a server, such as an application server, a client server, a web server, a database server, a host server, a proxy server, a virtual server (e.g., executing on computing hardware), or a server in a cloud computing system. In some implementations, the external system 420 includes computing hardware used in a cloud computing environment.

The network 425 includes one or more wired and/or wireless networks. For example, the network 425 may include a cellular network, a public land mobile network, a local area network, a wide area network, a metropolitan area network, a telephone network, a private network, the Internet, and/or a combination of these or other types of networks. The network 425 enables communication among the devices of environment 400.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
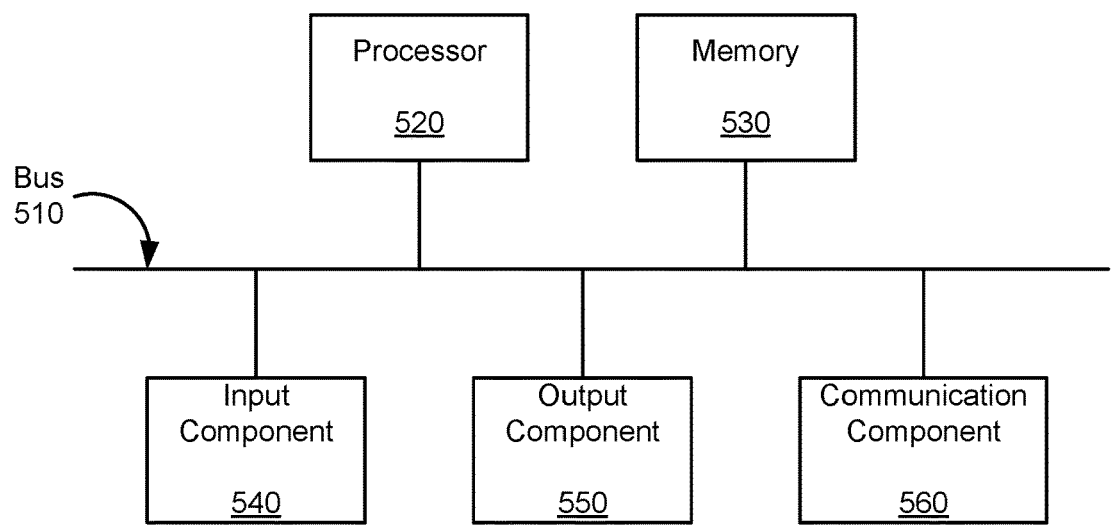
FIG. 5 is a diagram of example components of one or more devices of FIG. 1 and/or FIG. 4.

FIG. 5 is a diagram of example components of a device 500, which may correspond to device 110, node 130, vehicle host 135, external system 140, device 405, node 410, vehicle host 415, and/or external system 420. In some implementations, device 110, node 130, vehicle host 135, external system 140, device 405, node 410, vehicle host 415, and/or external system 420 include one or more devices 500 and/or one or more components of device 500. As shown in FIG. 5, device 500 may include a bus 510, a processor 520, a memory 530, an input component 540, an output component 550, and a communication component 560.

Bus 510 includes one or more components that enable wired and/or wireless communication among the components of device 500. Bus 510 may couple together two or more components of FIG. 5, such as via operative coupling, communicative coupling, electronic coupling, and/or electric coupling. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform one or more operations or processes described elsewhere herein.

Memory 530 includes volatile and/or nonvolatile memory. For example, memory 530 may include random access memory (RAM), read only memory (ROM), a hard disk drive, and/or another type of memory (e.g., a flash memory, a magnetic memory, and/or an optical memory). Memory 530 may include internal memory (e.g., RAM, ROM, or a hard disk drive) and/or removable memory (e.g., removable via a universal serial bus connection). Memory 530 may be a non-transitory computer-readable medium. Memory 530 stores information, instructions, and/or software (e.g., one or more software applications) related to the operation of device 500. In some implementations, memory 530 includes one or more memories that are coupled to one or more processors (e.g., processor 520), such as via bus 510.

Input component 540 enables device 500 to receive input, such as user input and/or sensed input. For example, input component 540 may include a touch screen, a keyboard, a keypad, a mouse, a button, a microphone, a switch, a sensor, a global positioning system sensor, an accelerometer, a gyroscope, and/or an actuator. Output component 550 enables device 500 to provide output, such as via a display, a speaker, and/or a light-emitting diode. Communication component 560 enables device 500 to communicate with other devices via a wired connection and/or a wireless connection. For example, communication component 560 may include a receiver, a transmitter, a transceiver, a modem, a network interface card, and/or an antenna.

Device 500 may perform one or more operations or processes described herein. For example, a non-transitory computer-readable medium (e.g., memory 530) may store a set of instructions (e.g., one or more instructions or code) for execution by processor 520. Processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry is used instead of or in combination with the instructions to perform one or more operations or processes described herein. Additionally, or alternatively, processor 520 may be configured to perform one or more operations or processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
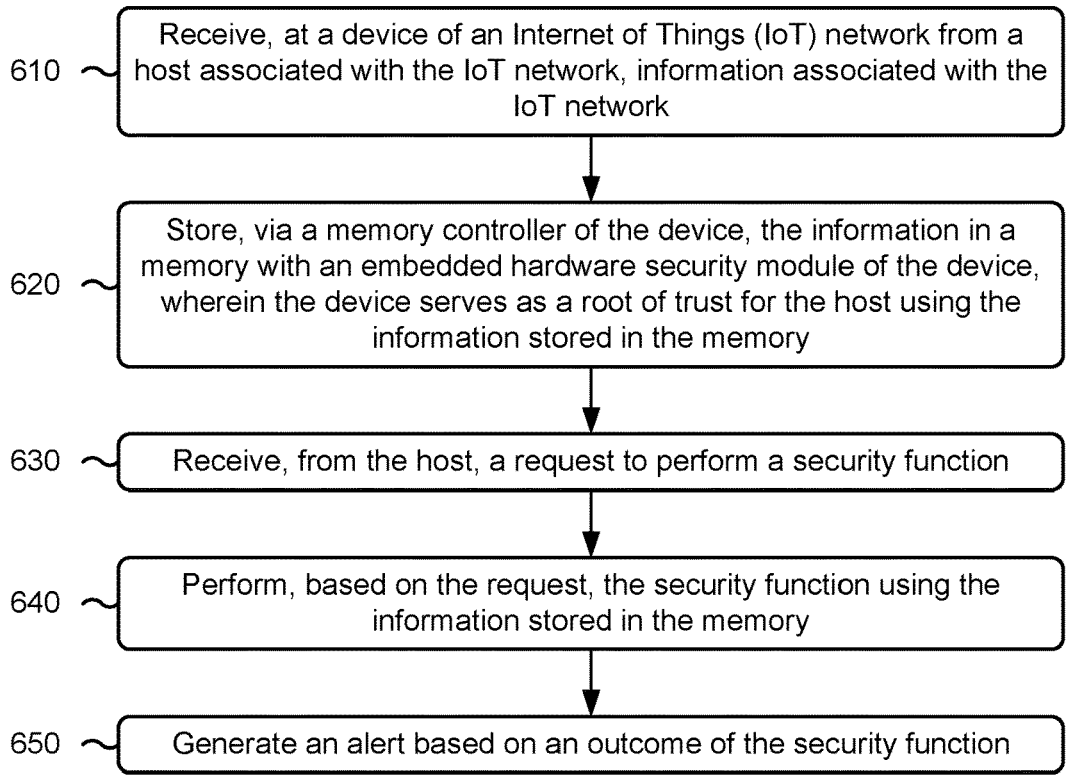
FIG. 6 is a flowchart of an example process relating to an IoT network that includes a device with an embedded hardware security module.

FIG. 6 is a flowchart of an example method 600 associated with performing security functions for an IoT network. In some implementations, one or more process blocks of FIG. 6 may be performed by a device (e.g., device 110 and/or device 405). In some implementations, one or more process blocks of FIG. 6 may be performed by another device or a group of devices separate from or including the device, such as node 410, vehicle host 415, and/or external system 420. Additionally, or alternatively, one or more process blocks of FIG. 6 may be performed by one or more components of device 500, such as processor 520, memory 530, input component 540, output component 550, and/or communication component 560.

As shown in FIG. 6, the method 600 may include receiving, at a device of an IoT network from a host associated with the IoT network, information associated with the IoT network (block 610). As further shown in FIG. 6, the method 600 may include storing, via a memory controller of the device, the information in a memory with an embedded hardware security module of the device, wherein the device serves as a root of trust for the host using the information stored in the memory (block 620). As further shown in FIG. 6, the method 600 may include receiving, from the host, a request to perform a security function (block 630). As further shown in FIG. 6, the method 600 may include performing, based on the request, the security function using the information stored in the memory (block 640). As further shown in FIG. 6, the method 600 may include generating an alert based on an outcome of the security function (block 650).

Although FIG. 6 shows example blocks of a method 600, in some implementations, the method 600 may include additional blocks, fewer blocks, different blocks, or differently arranged blocks than those depicted in FIG. 6. Additionally, or alternatively, two or more of the blocks of the method 600 may be performed in parallel. The method 600 is an example of one method that may be performed by one or more devices described herein. These one or more devices may perform one or more other methods based on operations described herein, such as the operations described in connection with FIGS. 1-3.

In some implementations, a device of an in-vehicle IoT network includes a memory with an embedded hardware security module; a memory controller; and one or more components configured to: receive, from a vehicle host associated with the in-vehicle IoT network, a registration configuration during an initial provisioning of the device that configures the device to serve as a root of trust for the vehicle host; receive, from the vehicle host, information associated with a node of the in-vehicle IoT network or a user of a vehicle associated with the in-vehicle IoT network; store, via the memory controller, the information in the memory with the embedded hardware security module, wherein the device serves as the root of trust for the vehicle host using the information stored in the memory; and perform a security function for the in-vehicle IoT network in conjunction with the vehicle host using the information stored in the memory.

In some implementations, a method includes receiving, at a device of an IoT network from a host associated with the IoT network, information associated with the IoT network; storing, via a memory controller of the device, the information in a memory with an embedded hardware security module of the device, wherein the device serves as a root of trust for the host using the information stored in the memory; receiving, from the host, a request to perform a security function; performing, based on the request, the security function using the information stored in the memory; and generating an alert based on an outcome of the security function.

In some implementations, a system of an IoT network includes a vehicle host associated with the IoT network; a plurality of nodes in communication with the vehicle host; and a device in communication with the vehicle host, wherein the device includes a memory with an embedded hardware security module, and wherein the device comprises logic to receive, from the vehicle host, information associated with the IoT network; store the information in the memory with the embedded hardware security module of the device; and perform a security function for the plurality of nodes in conjunction with the vehicle host using the information stored in the memory.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, the term "component" is intended to be broadly construed as hardware, firmware, or a combination of hardware and software. As used herein, the term "logic" is intended to be broadly construed as hardware, firmware, or a combination of hardware and software. As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A device of an in-vehicle Internet of Things (IoT) network, comprising:
   a memory with an embedded hardware security module;
   a memory controller; and
   one or more components configured to:
      receive, from a vehicle host associated with the in-vehicle IoT network, a registration configuration during an initial provisioning of the device that configures the device to serve as a root of trust for the vehicle host;
      receive, from the vehicle host, information associated with a node of the in-vehicle IoT network or a user of a vehicle associated with the in-vehicle IoT network,
      wherein the information includes a unique device identification, for the node, that is based on a maker code associated with the node, a model code associated with the node, and a serial number associated with the node;
      store, via the memory controller, the information in the memory with the embedded hardware security module, wherein the device serves as the root of trust for the vehicle host using the information stored in the memory;
      provide, to the vehicle host, a reference associated with the unique device identification for storage at the vehicle host and for an identification of the node; and
      perform a security function for the in-vehicle IoT network in conjunction with the vehicle host using the information stored in the memory.

2. The device of claim 1, wherein the one or more components are further configured to:
   receive the information associated with the node during the initial provisioning of the device, wherein the information indicates a true node identity associated with the node;
   receive, from the vehicle host, a request to perform the security function of a node verification, wherein the request indicates a candidate node identity associated with the node;
   determine, during the node verification, that a tampering with the node has occurred based on a comparison of the true node identity, as stored in the memory, with the candidate node identity indicated in the request; and
   generate a security breach flag to indicate the tampering with the node.

3. The device of claim 1, wherein the one or more components are further configured to:
   receive the information associated with the user of the vehicle as user data, wherein the user data indicates a true user credential associated with the user of the vehicle;
   receive, from the vehicle host, a request to perform the security function of a user authorization for the user of the vehicle, wherein the request indicates a candidate user credential associated with the user;

determine, during the user authorization, that the user is not authenticated based on a comparison of the true user credential, as stored in the memory, with the candidate user credential indicated in the request; and generate an alert to indicate that the user is not authorized.

4. The device of claim 3, wherein the user authorization is a prerequisite for: a modification to the node of the in-vehicle IoT network, a new node inserted into the in-vehicle IoT network, or a replaced node of the in-vehicle IoT network.

5. The device of claim 4, wherein the modification to the node involves one or more of: an adjustment to one or more parameters associated with the node, a configuration change for the node, or a firmware change for the node.

6. The device of claim 1, wherein communications between the device and the vehicle host are based on a public key infrastructure framework.

7. The device of claim 1, wherein the vehicle host is directly accessible to the device, and wherein the node is not accessible to the device.

8. The device of claim 1, wherein the node is one of:
a dumb node capable of performing a function;
an intelligent node having a computation and decision-making capability;
a sensor node capable of reporting sensory data on-demand or in accordance with a defined periodicity; or
a control node capable of controlling the dumb node, the intelligent node, or the sensor node.

9. The device of claim 1, wherein the one or more components are further configured to:
store the information in the memory based on an authenticated write command from the vehicle host; or
retrieve the information in the memory based on an authenticated read command from the vehicle host.

10. The device of claim 1, wherein the one or more components are further configured to:
store a security key for the vehicle host that enables secure communications between the vehicle host and a remote end point.

11. A method, comprising:
receiving, at a device of an Internet of Things (IoT) network from a host associated with the IoT network, information associated with the IoT network,
wherein the information includes a unique device identification, for a node of the IoT network, that is based on a maker code associated with the node, a model code associated with the node, and a serial number associated with the node;
storing, via a memory controller of the device, the information in a memory with an embedded hardware security module of the device, wherein the device serves as a root of trust for the host using the information stored in the memory;
providing, to the host, a reference associated with the unique device identification for storage at the host and for an identification of the node;
receiving, from the host, a request to perform a security function;
performing, based on the request, the security function using the information stored in the memory; and
generating an alert based on an outcome of the security function.

12. The method of claim 11, wherein the information associated with the IoT network is a true user credential of a user associated with the IoT network.

13. The method of claim 12, wherein:
performing the security function comprises comparing a candidate node identity with a true node identity stored in the memory; and
generating the alert comprises generating a first alert that indicates the candidate node identity does not correspond with the true node identity or a second alert that indicates the candidate node identity does correspond with the true node identity.

14. The method of claim 12, wherein:
performing the security function comprises comparing a candidate user credential with the true user credential stored in the memory; and
generating the alert comprises generating a first alert that indicates the candidate user credential does not correspond with the true user credential or a second alert that indicates the candidate user credential does correspond with the true user credential.

15. The method of claim 11, wherein the request to perform the security function is based on one of: a modification to a node of the IoT network, a replacement of the node of the IoT network, or a newly added node to the IoT network.

16. The method of claim 11, wherein receiving the information associated with the IoT network comprises receiving the information during an initial provisioning of the device.

17. The method of claim 11, wherein the IoT network is an in-vehicle IoT network.

18. A system of an Internet of Things (IoT) network, comprising:
a vehicle host associated with the IoT network;
a plurality of nodes in communication with the vehicle host; and
a device in communication with the vehicle host, wherein the device includes a memory with an embedded hardware security module, and wherein the device comprises logic to:
receive, from the vehicle host, information associated with the IoT network,
wherein the information includes a unique device identification, for a node of the plurality of nodes, that is based on a maker code associated with the node, a model code associated with the node, and a serial number associated with the node;
store the information in the memory with the embedded hardware security module of the device;
provide, to the vehicle host, a reference associated with the unique device identification for storage at the vehicle host and for an identification of the node; and
perform a security function for the plurality of nodes in conjunction with the vehicle host using the information stored in the memory.

19. The system of claim 18, wherein the device is only accessible to the vehicle host and is not accessible to the plurality of nodes.

20. The system of claim 18, wherein the device comprises logic to:
receive, from the vehicle host, a request to perform the security function; and
generate an alert based on an outcome of the security function.

21. The system of claim 20, wherein the request to perform the security function is based on one of: a modification to a node of the IoT network, a replacement of the node of the IoT network, or a newly added node to the IoT network.

22. The system of claim 18, wherein the node is one of:
a dumb node capable of performing a function;
an intelligent node having a computation and decision-making capability;
a sensor node capable of reporting sensory data on-demand or in accordance with a defined periodicity; or
a control node capable of controlling the dumb node, the intelligent node, or the sensor node.

23. The system of claim 18, wherein communications between the device and the vehicle host are based on a public key infrastructure framework.

24. The system of claim 18, wherein the IoT network is an in-vehicle IoT network.

\* \* \* \* \*